United States Patent [19]

Pierce et al.

[11] Patent Number: 4,745,810
[45] Date of Patent: May 24, 1988

[54] FLANGELESS TRANSMITTER COUPLING TO A FLANGE ADAPTER UNION

[75] Inventors: Dean S. Pierce, St. Paul; Roger L. Frick, Chanhassen; Gerald R. Cucci, Minneapolis, all of Minn.

[73] Assignee: Rosemount Inc., Eden Prairie, Minn.

[21] Appl. No.: 907,481

[22] Filed: Sep. 15, 1986

[51] Int. Cl.⁴ .......................... G01L 7/08; G01L 9/00; G01L 19/00
[52] U.S. Cl. ...................................... 73/706; 73/717; 73/756
[58] Field of Search ................. 73/706, 756, 717, 718, 73/719, 720, 721, 722, 861.42

[56] References Cited

U.S. PATENT DOCUMENTS

| | | | |
|---|---|---|---|
| 4,218,925 | 8/1980 | Di Domizio, Jr. | 73/706 |
| 4,370,890 | 2/1983 | Frick | 73/718 |
| 4,466,290 | 8/1984 | Frick | 73/756 |
| 4,527,428 | 7/1985 | Shimada et al. | 73/718 |
| 4,578,735 | 3/1986 | Knecht et al. | 361/283 |
| 4,603,371 | 7/1986 | Frick | 361/283 |

Primary Examiner—Donald O. Woodiel
Attorney, Agent, or Firm—Kinney & Lange

[57] ABSTRACT

A pressure transmitter is coupled directly to an industry standard flange adapter union having a standard bolt hole spacing. Small diameter isolator diaphragms are positioned on the transmitter housing at locations so that the industry standard flange adapter union which couple fluid pressure sources to act on the isolator diaphragms without an intermediate large flange or manifold as is presently required and using the fasteners for the adapter union to complete the coupling. The smaller isolaters fit within the bolt hole spacing of the industry standard adapter union.

17 Claims, 4 Drawing Sheets

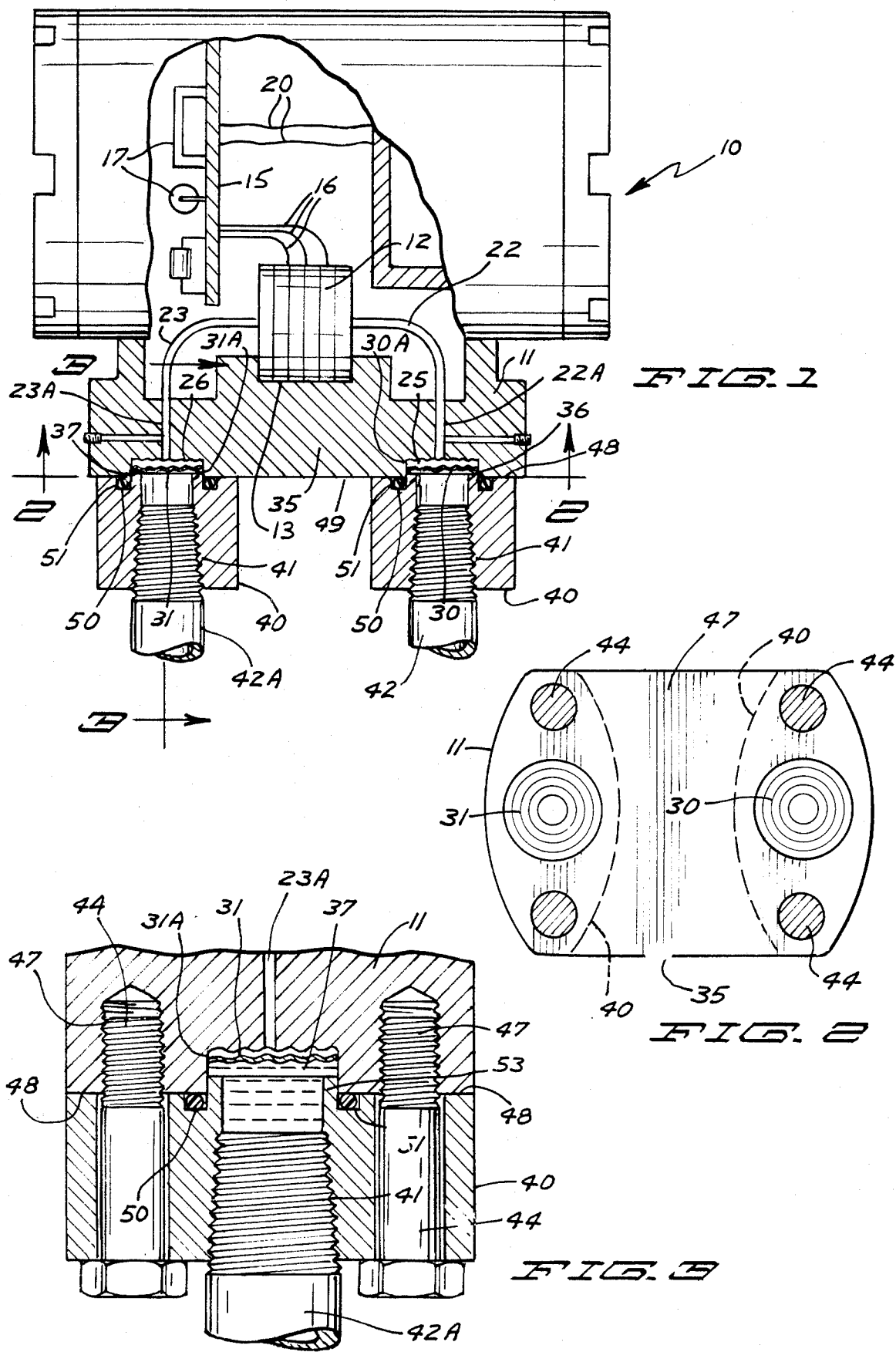

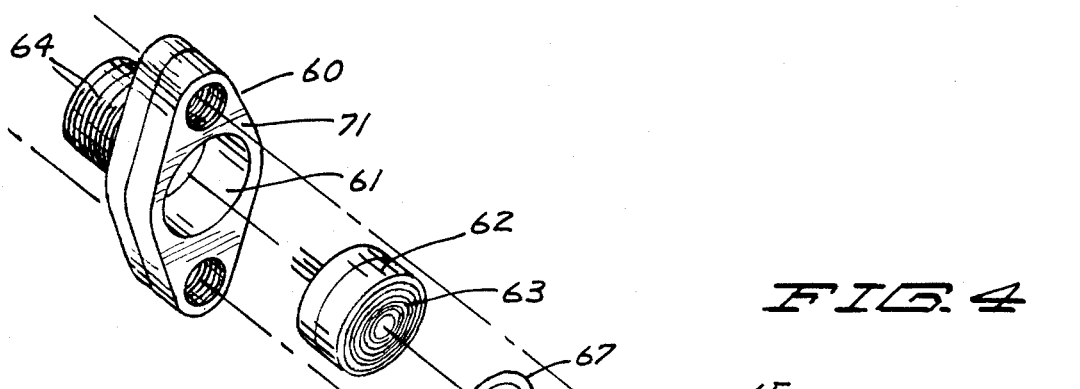
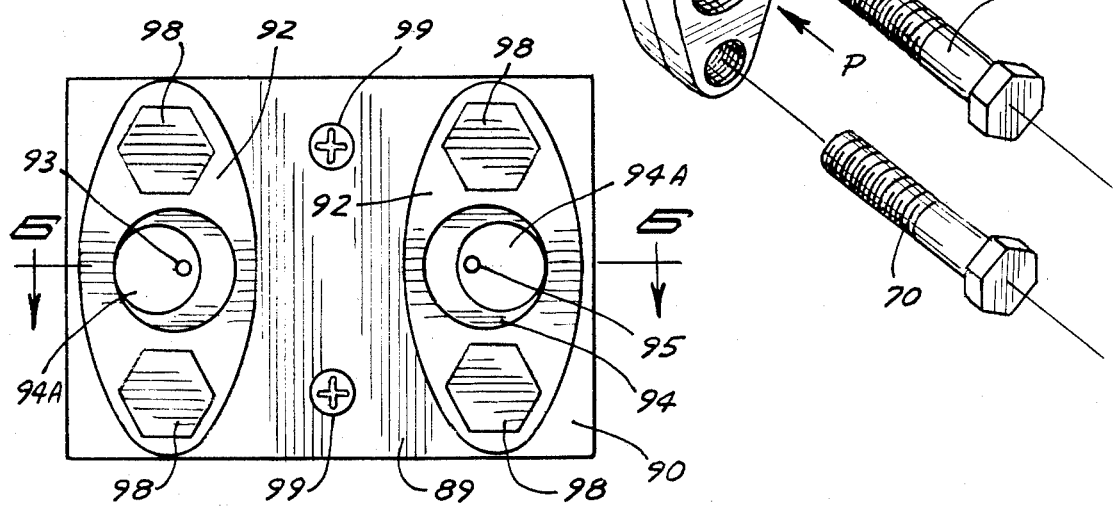
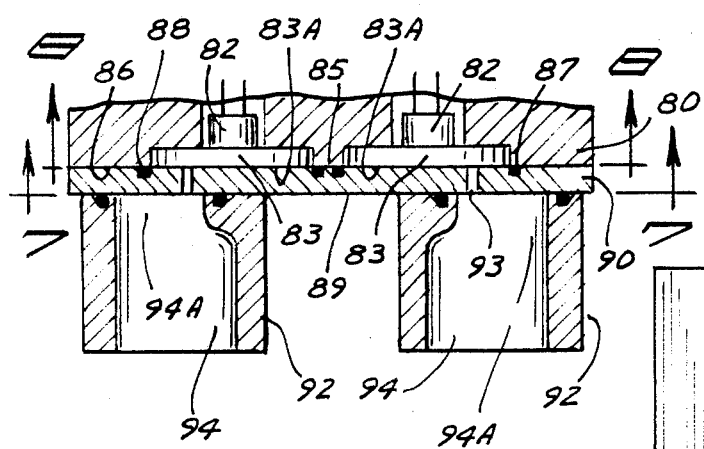
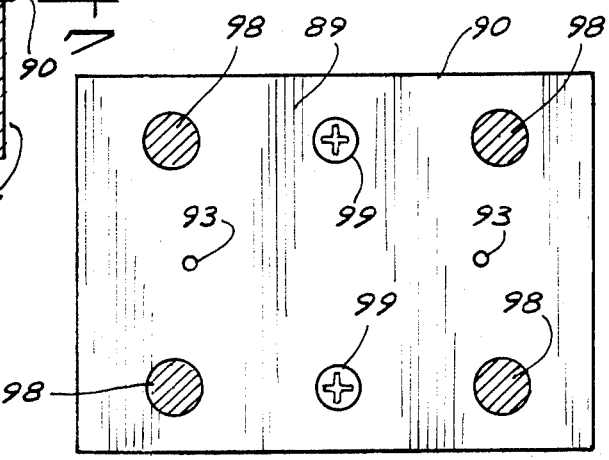

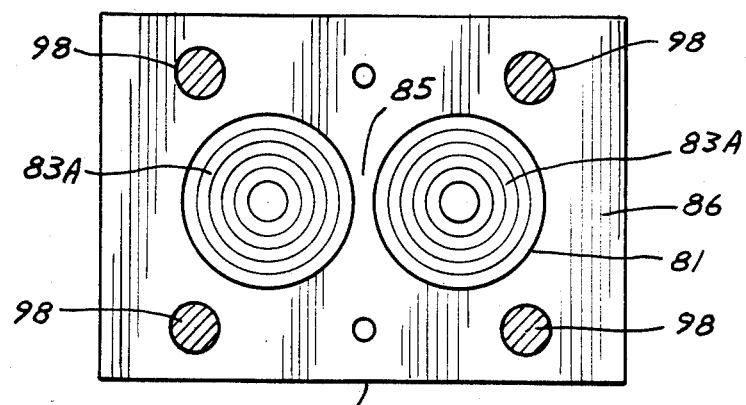
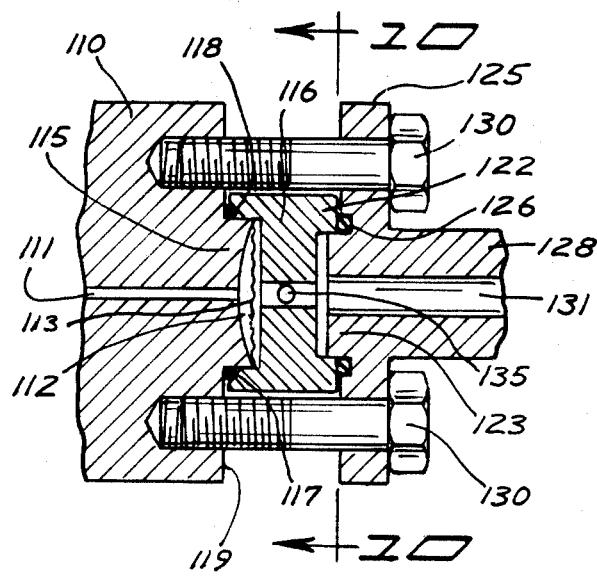 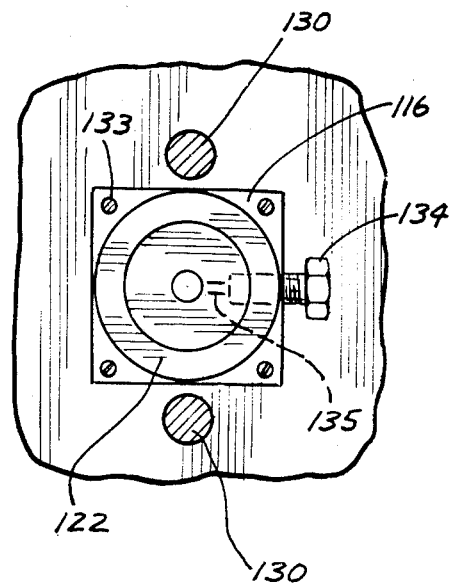

FLANGELESS TRANSMITTER COUPLING TO A FLANGE ADAPTER UNION

BACKGROUND OF THE INVENTION

1. Field of the Invention

The present invention relates to isolated pressure transmitters which are connected directly to an industry standard union.

2. Description of the Prior Art.

It is an industry standard practice to use one or more flange adapter unions for removably coupling process piping to isolated pressure transmitters. The flange adapter union is a coupling device which connects a process pipe carrying a pressurized fluid to a flanged surface on a pressure transmitter. The flange adapter union typically has a central threaded fitting at a first surface facing in a first direction for mechanically attaching the process pipe to the flange adapter union and for sealing the process pipe to the flange adapter union. The flange adapter union has a second surface facing in a second direction opposite the first direction adapted to couple to a massive flange on the pressure transmitter. The flange adapter union is removably attached to the flanged surface of the transmitter with a pair of bolts which also serve to compress a seal around a central fluid opening on the surface of the flange adapter union. The flange adapter union allows the transmitter to be coupled to a threaded pipe without rotating either the pipe or the transmitter to engage the pipe threads. The fluid opening on the second surface of the flange adapter union is small, and the spacing between the bolts is restricted, and hence a massive intermediate flange is used to couple the fluid from the small restricted opening on the flange adapter union to a larger isolator diaphragm in the transmitter.

The current standard adapter unions each have a pair of mounting bolts spaced on industry standard 1⅞" bolt centers, and which are centered on a central pressure port that delivers fluid to the transmitter. The pressure port is normally threaded for a pipe connection, and the union must be rotated or screwed onto the pipe for connection to the input pressure source. Alternately, a three-valve manifold comprising another expensive, relatively heavy intermediate member having the same industry standard bolt mounting configuration on both sides has been disposed between the unions and the transmitter's flange.

In prior art transmitters, the commonly used isolator diaphragms have been too large to fit within the bolt mounting patterns of the flange adapter unions, and hence massive flanges as shown in U.S. Pat. No. 4,466,290 have been used to route fluid from the flange surface mating with the union to a flange surface that mates with a surface on the transmitter which is large enough to accomodate the large isolator diaphragms. The isolator diaphragms act through an incompressible fluid to couple pressure to a pressure sensor in the transmitter.

Prior art transmitters require large isolators because the pressure sensors require a relatively large volume of fluid behind the isolator diaphragms and the fill fluid expands as temperature increases. The isolator diaphragm has to be large so that it is sufficiently compliant to accomodate changes in volume without introducing a pressure measurement error by changing the pressure on the sensor itself. Also, prior art sensors required a relatively large displacement of fill fluid for actuation, so full scale deflection of the sensor needed a large cOmpliant isolation diaphragm to move the necessary amount of isolating fluid to provide the displacement.

Thus, while the standard adapter unions are widely used, they have had to be separately bolted onto flange assemblies, with the flange assembly then bolted to the transmitter, increasing the number of seals that are necessary, the number of bolts that are necessary, and also increasing the weight of the overall transmitter assembly. The large number and size of the seals contribute to leaks and limit the reliability of the transmitter. The larqe area of the flange exposed to the pressurized fluid is subject to a correspondingly large force which is transferred to the flange bolts creating a potential for breakage.

SUMMARY OF THE INVENTION

The present invention relates to a flangeless pressure transmitter assembly, which eliminates the need for a massive flange between the transmitter and coupling members such as standard flange adapter unions. The standard adapter unions are constructed to an industry standard bolt spacing with respect to a center axis, which also forms the axis of the pipe that is connected to the unions. Thus, coupling of a transmitter directly to an industry standard adapter union so that the one surface of the union mates directly with a surface of the transmitter is a feature of the present invention. This is accomplished by reducing the size of the isolation diaphragms used for isolating the fluid being sensed from the sensor and using the bolts that attach the union to provide the necessary sealing force against the transmitter.

When sensing elements with built-in overpressure protection, such as shown in U.S. Pat. No. 4,370,890 are used, the total oil volume and the sweep oil volume are low compared to sensors without such built-in overpressure protection. Transmitters with overpressure protection mechanisms that are separate from the pressure sensor require a larger volume of oil, such as shown, for example, in U.S. Pat. No. 4,218,925 to DiDomizio.

The present day miniature solid state sensors that are batch fabricated from silicon, and have very rigid diaphragms (for example, made out of silicon or other suitable materials which are brittle) require even less sweep volume when they are displaced from a rest or zero position to full scale. When constructed with built-in overload protection as shown in U.S. Pat. No. 4,578,735 to Knecht et al. or U.S. Pat. No. 4,603,371 to Frick, the total oil volume of the transmitter can be kept correspondingly small, i.e., less than 0.01 up to 0.05 cubic inch. Thus, when isolation diaphragms are used which provide a flexible diaphragm acting against a column of fluid, which in turn acts directly against the sensor diaphragm, the volume of the noncompressible fluid that has to be moved by the isolation diaphragm in order to provide a full-scale deflection of the sensing diaphragm is substantially reduced. This means that the isolation diaphragm has to deflect less and the oil forming the force transmission material between the isolation diaphragm and the sensor is reduced in volume. The temperature induced volume change of such oil is thus less and a reduction in the isolation diaphragm size can be made.

The present invention includes configurations which have a transmitter that provides an output indicating a pressure of a process fluid supplied through a coupling union to an inlet coupled to the union for receiving the fluid. The inlet is made so that it has a coupling surface that faces the standard coupling union with seal means disposed on the coupling surface for sealing the passageway for coupling process fluid from the union to the inlet. Bolts are used for coupling the union to the transmitter and compressing the seal means, and are the standard bolts that are used for the coupling union. Isolator means are disposed in the inlet means, with an isolator diaphragm surface facing the union and surrounded by the seal means for coupling pressure signals from the process fluid with the transmitter. The isolator diaphragm acts on an incompressible fluid that is in an enclosed chamber and passageway leading to a sensor for receiving a pressure from the isolators. The substantially incompressible fluid is moved by deflection of the isolator diaphragm or isolator means and in turn acts on the sensor of the transmitter.

The isolators can be made so that they will fit within the bolt patterns of the standard union. The isolators also can be made so that they fit within the standard sealing ring that is applied on the industry standard unions and thus are limited to a diameter of about 0.72". The pressure sensor may be directly behind the isolator or coupled to the isolator diaphragm, or the incompressible fluid moved by the movement of the isolator diaphragm can be routed through passageways to a sensor located elsewhere in the transmitter.

In another form of the invention, a transmitter is made with a slightly larger isolator diaphragm, and an adapter ring is placed between the union and the transmitter surface. The transmitter surface and the union are coupled tightly together in surface to surface compression. The adapter ring has a small diameter section against the union and a larger diameter section facing and sealing on the transmitter.

Another form of the invention allows for even larger isolator diaphragms, up to about 1.2" diameter active area. These are generally intended to be used with a differential pressure transmitter. By locating the two isolator diaphragms within the industry standard 1⅝" by a 2⅛" bolt pattern that is necessary for the four bolts used with two side by side adapter unions to permit one of the adapter unions to swing past the other about its center, and then using an adapter plate to contain the pressure so that the center of the unions is offset from the center of the isolator diaphragms, the larger isolater diaphragms can be accomodated without a massive flange. The 1⅝" by 2⅛" rectangular pattern of bolt centerlines is an industry standard pattern for coupling process piping to a differential pressure transmitter. The 1⅝" dimension is characteristic of the bolt spacing of the flange adapter union, while the 2⅛" spacing is compatable with connection to orifice flange connections according to ANSI Standard B 16.36, "Steel Orifice Flange Standard." The adapter plate is not a massive flange, but comprises a relatively thin plate that is compressed to seal to the transmitter body and to the unions by the same bolts that are used to fasten the unions.

The use of the flangeless transmitter as disclosed herein reduces cost, and also reduces weight which makes mounting the transmitter easier. The flangeless transmitter also has inherent reliability advantages over the prior art since the number and size of process fluid seals are reduced and the forces due to fluid pressure which are contained by bolts are also reduced. Operation is not compromised, and in particular, when sensors having low volume changes for full scale deflection are available, the smaller isolator diaphragms provide adequate movement for operation across a full pressure range and adequate protection for temperature-induced volume differentials of the isolator fluid.

BRIEF DESCRIPTION OF THE DRAWINGS

FIG. 1 is a view of a transmitter for sensing differential pressure made according to the present invention, and having parts in section and parts broken away;

FIG. 2 is a sectional view taken as on line 2—2 in FIG. 1;

FIG. 3 is a sectional view taken as on line 3—3 in FIG. 1;

FIG. 4 is an exploded perspective view of a modified form of the invention showing an isolator and sensor assembly to be installed between an industry standard adapter union and a substantially matching transmitter housing;

FIG. 5 is a view of a further modified form of the invention looking in direction along the axis of input lines to industry standard adapter unions;

FIG. 6 is a sectional view taken as in 6—6 in FIG. 5;

FIG. 7 is a sectional view taken as in line 7—7 in FIG. 5;

FIG. 8 is a sectional view taken as in line 8—8 in FIG. 5;

FIG. 9 is a vertical sectional view of a further modified form of the invention showing an adapter ring positioned between a standard adapter union and a transmitter body;

FIG. 10 is a sectional view taken as in line 10—10 in FIG. 9;

DETAILED DESCRIPTION OF THE PREFERRED EMBODIMENTS

Figure 11:
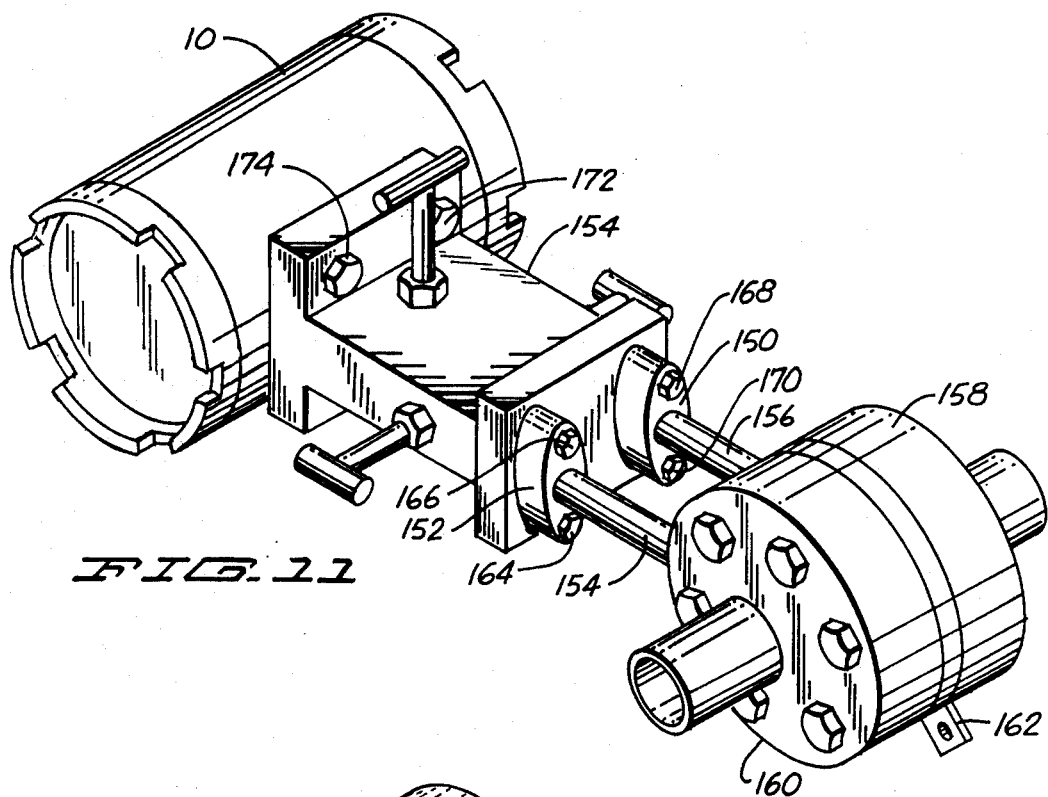
FIG. 11 is a perspective view of the transmitter of FIG. 1 coupled to flange adapter unions through a three valve manifold.

A pressure transmitter indicated generally at 10 as shown is a differential pressure transmitter and has a case 11 which houses a differential pressure sensor 12 of suitable design. The differential pressure sensor 12 is supported in the case 11 in suitable support members 13, and is preferably of a design that has stiff sensing diaphragms which deflect very little under full scale pressure, so that the amount of swept volume during displacement of the sensor diaphragms between zero position and a full-scale deflected position is minimized. Generally, the sensor has overpressure stops to stop deflection when under maximum rated pressure. The interior of the case 11 includes a supported circuit board 15, that has circuit components 17 to receive pressure signals on leads 16 from the differential pressure sensor 12. The components 17 also are designed to provide an output along lines 20 to suitable remote indicating equipment (not shown).

The circuit can be of any desired type usable with differential pressure transmitters and would have the usual adjustments for span and zeroing.

While the interior construction of the sensor 12 is not shown, it can be similar to that shown in U.S. Pat. No. 4,572,000, issued Feb. 26, 1986 to Robert R. Kooiman or it can be as shown in U.S. Pat. No. 4,370,890 to Roger L. Frick, or as shown in U.S. Pat. No. 4,578,735 to Knecht et al., and has a first and second inlet piping 22 and 23, respectively, that lead to deflecting sensing diaphragms on the interior of the sensor. The piping 22 and 23 in turn is connected to enclosed passageways 22A and 23A, respectively, that open to small chambers 25 and 26, respectively, which are closed with flexible isolation diaphragms 30 and 31, respectively. The edges of diaphragms 30 and 31 are positioned in an inlet portion 35 of case 11 and are positioned in recesses 36 and 37 that form inlet means. In the case 11 the diaphragms 30 and 31 are suitably welded or otherwise joined around their peripheries indicated at 30A and 31A, respectively, to the walls of recesses 36 and 37 to form enclosed chambers that are filled with an incompressible fluid (silicone oil, for example). The filling of fluid in the piping 22 and 23 and the chambers 25 and 26 can be done in a conventional manner and as shown, fill openings that can be sealed are provided in case 11. The small pressure receiving inlet means 36 and 37, respectively, open to outer surfaces of the respective diaphragms 30 and 31.

Each of the inlet means has a standard flange adapter union 40 connected thereto. The flange adapter unions are identical in construction, and as can be seen in FIGS. 1 and 3 in particular, each of the flange adapter unions 40 have a central threaded opening 41 into which a suitable pressure supply pipe 42, and 42A, can be threaded. The pipes 42 and 42A each are from a separate source of process fluid under pressure, the differential in pressure of which is to be measured. Thus, the process fluid pressures in the respective inlet pipes 42 and 42A, which comprise process fluid sources, act through the inlet means 36 and 37, on the respective isolation diaphragm.

The standard adapter unions are each held in position through the use of two bolts 44 on opposite sides of the inlet means and isolation diaphragms 30 and 31, respectively. The standard adapter unions 40 are generally shaped as shown in dotted lines on the left-hand side of FIG. 2, and the capscrews 44 pass through provided openings. The capscrews 44 are threaded into suitable threaded openings 47, that are formed in the inlet portion 35 of case 11 and are used to clamp a surface of the standard adapter unions to a coupling surface 49 of the inlet portion 35.

Each of the adapter unions has a suitable annular groove indicated at 50 that has a suitable standard seal 51 therein. The seals 51 can be made of any suitable material that is compressible, and if desired the seal can be made of low-friction "Teflon" or other sealing materials, such as commonly known "O rings".

In this form of the invention, the isolator means or isolation diaphragms are disposed in the inlets, and have surfaces that face the standard adapter unions. The isolation diaphragms in turn are surrounded by the seals 51, and as perhaps can be best seen in FIG. 3, the standard adapter unions can have a short annular boss 53 that fits inside the inlet means openings, to guide the flange adapter unions properly, and insure that the seals 51 provide adequate sealing.

Thus, when a differential in pressure between the lines 42 and 42A is present, the isolation diaphragms 30 or 31 will deflect, causing the incompressible fluid in the chambers 25 and 26 to act through the piping 22 and 23 to in turn act on the sensor 12. This will result in a readout on the output signal lines 20.

Because the standard adapter unions are directly coupled to the coupling surface of the transmitter, there is no need for interposing a massive flange, thereby achieving the advantages of eliminating such flanges, reducing weight, reducing cost, reducing the number of bolts that are used, and the size and number of the seals needed. Center distances for the openings 41 is such that the flange adapter unions can be tightened onto the pipes 42 and 42A without removing the transmitter. In other words the standard adapter unions have a sufficient swing distance to be operable.

In the embodiment shown in FIGS. 1 and 2, the isolator diaphragms are generally made to be 0.728" diameter, so that the boss 53 on the adapter unions fits into the inlet means, providing for an adequate seal on the seals 51.

In FIG. 4 a modified form of the invention is shown utilizing a 0.728" diameter isolator diaphragm, for guage pressure or absolute pressure measurement sensors. In this form of the invention, the transmitter body indicated generally at 60 is of substantially the same outer configuration as the standard adapter union that is shown at 65. The transmitter body 60 has a sensor housing receiving opening 61, the outer end of which forms an inlet, and which is of size to receive a sensor assembly 62 that has an isolator diaphragm 63 with an outer surface facing outwardly. The sensor assembly 62 further comprises an incompressible fluid coupling pressure from the isolator diaphragm to sensor means in sensor assembly 62. The bore 61 has a shoulder that supports the sensor 62 in position, and the outer end of the opening from the housing comprises inlet means into which process fluid is provided from the center opening 66 of the standard adapter union 65. A suitable sealing ring 67 corresponding to the ring 51 is used, and the standard adapter union 65 has the same type of boss 53 that fits into the opening 61 to provide process fluid to act against the isolator surface 63 and thus act on the sensor in sensor assembly 62. Suitable electrical leads 64 are provided at the back of the transmitter body 60.

The standard adapter union 65 is held in place, as shown, with suitable capscrews or bolts 70 that pass through provided openings in the standard adapter union 65 and clamp a surface of the adapter union against a coupling surface 71 of the transmitter body or housing 60. The capscrews 70 compress the seal 67, and also hold the sensor 62 in place. In any event, the capscrews provide the needed compression for the pressure carrying seal between the transmitter body 60 and the standard adapter union.

The isolation diaphragm 63 is relatively small in diameter, and thus the two capscrews 70 can form the dual function of clamping the standard adapter union directly to the coupling surface 71 and resisting the forces generated by the process fluid pressures acting on the diaphragm.

A further modified form of the invention is shown in FIGS. 5–8. In this form of the invention, the details of the transmitter housing are not shown. As fragmentarily shown in FIG. 6, a transmitter housing 80 is provided with inlet recesses or inlet means 81 leading to a differential pressure sensor. In this form of the invention, the inlet means 81 are provided for supporting two separate pressure sensor assemblies 82 therein, each sensing a separate pressure, and the sensor assemblies include isolator portions 83 that have isolator surfaces 83A facing outwardly from the transmitter 80.

In this form of the invention, the isolator surfaces 83A are of larger diameter than the previous forms of the invention, and essentially have a diameter of 1.2 inches. The center section indicated generally at 85 between these inlet openings is only wide enough so that suitable seals to isolate the two inlet openings can be seated against the coupling surface indicated at 86 (see FIG. 8).

The necessary spacing between the standard adapter unions that permits the adapter unions to rotate relative to each other when they are in the position as shown in FIG. 5 so they can be threaded onto inlet pipes is maintained by using an adapter plate indicated generally at 90. The plate 90 is relatively thin and has a flat surface that seals against the coupling surface 86, and carries suitable seals indicated at 87 and 88 for the two inlet isolator surfaces 83A. The seals 87 and 88 are compressed, for sealing purposes, and the adapter plate 90 also has an outer coupling surface 89 against which the standard adapter unions 92 are mounted. In order to provide for the correct spacing of the standard adapter unions while maintaining the isolator surfaces 83A as large as possible, the adapter plate 90 has inlet passageways 93 that are off center from the center of the pressure sensors 82, and off center from the isolation diaphragm surfaces 83A. The openings are spaced farther apart than the centers of the inlets, as shown, to permit the standard adapter unions to be sealed appropriately and yet kept at a minimum spacing. In addition, the interior passageways 94 of the standard adapter unions 92 are slightly offset as shown at 94A near the outlet surfaces thereof, so that the passageways 93 are not centered on the passageways 94 either. The standard adapter unions 92 have suitable "O" rings 96 that seat against the coupling surface 89 of the adapter plate 90, to provide a pressure seal. The standard adapter unions 92 are held in place so that one surface of the adapter plate 90 is forced against and sealed against the coupling surface 86 of the transmitter 80 through the use of only the two capscrews 98 shown in FIG. 5.

The adapter plate 90 can be independently supported on the transmitter body 80, for example, with suitable small screws 99, in the center between the standard adapter unions. The screws 99 can be counterbore capscrews that do not protrude beyond the coupling surface 89 of the adapter plate 90.

In FIGS. 9 and 10 a further modified form of the present invention is shown, wherein standard adapter unions are used, but with an adapter ring to permit the isolation diaphragm to be slightly larger in diameter. As shown in FIG. 9, a transmitter body 110 has an internal passageway 111 that leads from a chamber 112 enclosed by a flexible isolater diaphragm 113 in a manner previously described. The diaphragm 113 encloses the chamber including the passageways 111 and the chamber 112 that is filled with an incompressible fluid.

The diaphragm 113 forms an inlet means, and as shown is supported on a neck 115 on the transmitter body. In this form of the invention, an adapter ring 116 is provided, so that the diaphragm 113 is of larger diameter than in the first form of the invention.

The adapter ring 116 has a first ring portion 117 at one end that surrounds the neck 115, and has an edge surface that bears against the seal 118 that in turn bears against the coupling surface 119 of the transmitter body. The ring 117 has an internal diameter that surrounds the neck 115 and is of a first diameter that is larger than the internal diameter of a second ring portion 122 that is formed at the opposite end of the coupling ring 116. Ring portion 122 is of size to receive the boss 123 of a standard adapter union 125. A sealing ring 126 is provided in the groove of the adapter union to seal against a surface of the ring portion 122. The standard adapter union 125 is connected to a suitable connecting tube or pipe 128.

Suitable capscrews (or bolts) 130 are provided for clamping the standard adapter union 125 against the coupling ring 116. In particular this will provide compression on the seal 126 to hold it sealed against the outer surface of the ring portion 122, and at the same time compress the seal 118 through the ring 117 against the coupling surface 119 of the transmitter. The outer surface of the diaphragm 113 receives process fluid through a passageway 131. The isolating fluid is in the chamber 112 and the passageway 111, to lead to the pressure sensor.

As shown in FIG. 10, the adapter ring 116 actually is square in cross-section in the center portions thereof, and can be held on to the transmitter body with suitable capscrews 133. Additionally, a bleed screw 134 can be provided in a passageway 135, to permit bleeding out fluids from the ring, if desired, to remove air from the lines.

Here, too, two capscrews 130 holding the standard adapter union directly to the transmitter body will provide the clamping force to clamp the standard adapter union directly to the transmitter through a coupling ring 116. No massive flange is required. It should therefore be noted that the smaller diameter opening of the ring portion 122 permits the standard adapter union to be sealed in place, while the larger diameter ring portion 117 surrounding the isolation diaphragm 113 provides for a larger diaphragm to in turn permit greater expansion of the oil in the chambers 112 and passageways 111 which would otherwise adversely affect the pressure sensor operation.

A summary of advantages of the present invention are as follows:

1. The massive flange(s) can be eliminated or greatly reduced in size. Fluid pressure is conveyed from the adapter unions to the respective isolator diaphragm without the need for a flange on the transmitter. In the prior art, massive flanges are needed because the diameter of the diaphragms is larger than the space available at the flange adapter union. The prior art flanges must be made of a material that is resistant to corrosion by the process fluid and are a costly transmitter component, and thus the cost of the new transmitter is reduced.
2. The size and number of seals is reduced when the transmitter is constructed as shown in FIGS. 1-4. One seal is needed between the union and the isolator. In the prior art, there are two seals for each passageway, one between the union and the flange and another between the flange and the isolator. There is less potential for leakage of process fluid and reliability is thus enhanced.
3. The number of bolts is reduced. There is only one pair of bolts needed to fasten the union to the transmitter and compress the seal. In the prior art, the bolts for the union fasten the union to the massive flange (or manifold), compressing a seal between the flange and the flange adapter union. Another set of fasteners (bolts) fasten the massive flange to the rest of the transmitter case.
4. The isolator is easily accessible for inspection and cleaning without removing a massive flange or manifold. Only the bolts that fasten the flange adapter union (or three-valve manifold) need to be removed for cleaning.

5. The compact arrangement of the isolator at the coupling surface for the union allows for a preferred small transmitter case. 6. The quantity of corrosion-resistant materials needed in the transmitter is reduced substantially because the isolators are small compared to the prior art and the massive flange has been completely eliminated.

7. The small isolator provides a small isolation fluid displacement that is compatible with stiff sensors such as silicon strain gauge or silicon capacitive sensors. In the prior art, sensors with larger displacement requirements needed larger isolators.

8. The transmitter can be easily fitted with a low cost adapter ring between the standard adapter union bolts. It provides additional protection to the isolator from mechanical damage and allows for a vent or drain valve for process fluid near the isolator and allows a larger isolator to be used.

9. The weight of the transmitter is reduced, thus simplifying mounting of the transmitter. In many cases, it can be supported directly on the process plumbing. Installation and service is simplified because the compact, lightweight unit can be easily handled, especially in difficult locations such as near the top of a cracking tower.

In FIG. 11, a differential pressure transmitter 10 is shown coupled to a pair of flange adapter unions 150,152 through a standard 3-valve manifold 154. The flange adapter unions 150,152 are spaced apart from one another so that threaded pipes 154,156 can couple straight into threaded holes in pipe flanges 158,160 without any bends or elbows. The threaded holes in pipe flanges 158,160 are spaced apart at the industry standard spacing of 2⅛" which allows sufficient space between flanges 158,160 for insertion of an orifice plate 162 and gaskets between the flanges. The threaded holes in flange adapter unions 150,152 are slightly off the center line of the bolts 164,166 or 168,170. This eccentricity permits the spacing to be adjusted for mechanical tolerances by rotating one or both union in half turn increments to get a spacing close to 2⅛". Four bolts such as bolts 172,174 are used to couple the 3-valve manifold 154 to transmitter 10 and compress the seals around the inlets on the transmitter. The transmitter 10 has no flanges, is lightweight and can thus be mechanically supported entirely by the piping connections. No separate support structure is needed for the lightweight transmitter.

Figure 12:
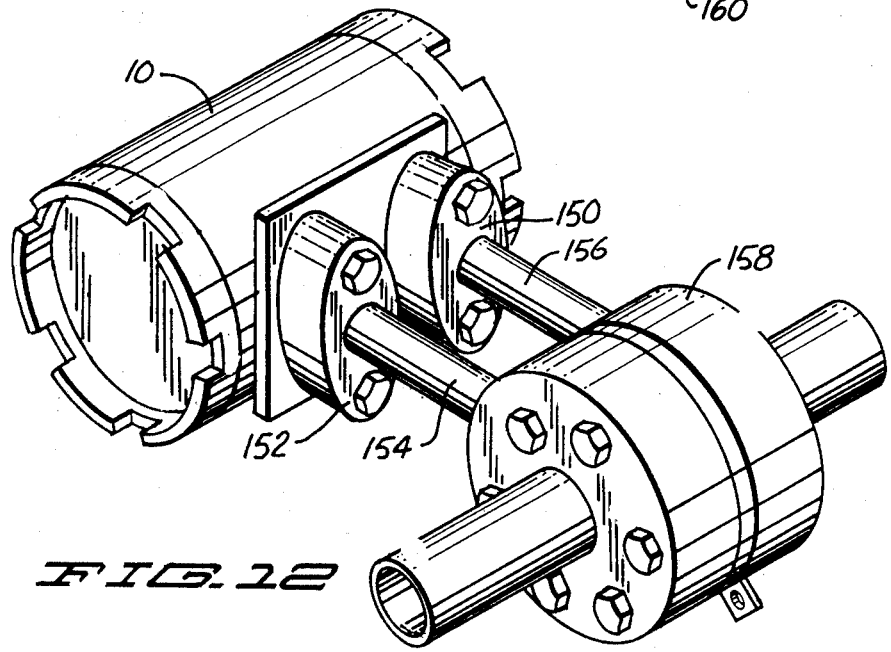
FIG. 12 is a perspective view of the transmitter of FIG. 1 coupled directly to flange adapter unions.

In FIG. 12, a transmitter 10 is shown coupled directly to flange adapter unions 150,152 which are threaded onto pipes 154,156 as in FIG. 11. In this installation, an installation of transmitter 10 is complete without the weight of the 3-valve manifold and an even more rugged installation than that of FIG. 11 is achieved, again, without the need for any additional mounting support for the transmitter other than the process connections.

The center spacing between the bolts on the adapter unions is no more than 1.7 inches while a 2 inch spacing is a maximum spacing.

While the invention has been described with reference to flange adapter unions with 1⅝ bolt centers which are spaced 2⅛ apart for differential pressure measurement, it is understood that the invention may also be used with standard flange adapter unions with 41.3 millimeter bolt centers which are spaced 54 millimeters apart for differential pressure measurement such as are described in DIN (Standard) 19 213 (Apr. 1980).

Although the present invention has been described with reference to preferred embodiments, workers skilled in the art will recognize that changes may be made in form and detail without departing from the spirit and scope of the invention.

In the transmitters shown in FIGS. 5–8 and FIGS. 9–10, the small screws 99 and 133 serve to fasten the corresponding plate 90 or ring 116 to the transmitter when the flange adapter unions are not in place. In the transmitters shown, the bolts which pass through the flange adapter union provide substantially all of the sealing force exerted on seals 118, 126, 96 and 88. The plate or ring thus can protect the isolators from mechanical damage during installation.

What is claimed:

1. A transmitter for providing an output indicative of a pressure of a process fluid supplied by a flange adapter union, comprising:

inlet means for receiving the process fluid having a coupling surface facing the flange adapter union and coupled thereto;

seal means disposed on the coupling surface for sealingly coupling the process fluid from the flange adapter union to the inlet means;

a first fastener disposed through the coupling surface, fastening the flange adapter union to the transmitter and compressing the seal means;

isolator means having an isolater surface for coupling pressure from the process fluid to the transmitter;

sensor means disposed in the transmitter for receiving a pressure and for providing the output; and coupling means coupled from the isolater means to the sensor means for coupling pressure therebetween comprising a substantially imcompressible fluid;

wherein the improvement comprises that the isolator means is reduced in size such that the isolator means is disposed in the inlet means facing the the flange adapter union and surrounded by the seal means.

2. The transmitter of claim 1 further comprising a second fastener spaced away from the first fastener and disposed through the coupling surface, fastening the flange adapter union to the transmitter and compressing the seal means.

3. The transmitter of claim 2, wherein at least a portion of the isolator surface is disposed between the first and second fasteners.

4. The transmitter of claim 2 wherein the first and second fasteners comprise bolts each passing through the coupling surface and the flange adapter union.

5. The transmitter of claim 4 wherein the centerlines of the bolts are spaced apart not more than two inches.

6. The transmitter of claim 4 wherein the centerlines of the bolts are spaced apart not more than 1.7 inches.

7. An improved transmitter for providing an output indicative of a pressure of a process fluid supplied by a flange adapter union, comprising:

an inlet for receiving the process fluid having a coupling surface facing the flange adapter union and coupled thereto;

a seal disposed on the coupling surface for sealingly coupling the process fluid from the flange adapter union to the inlet;

a pair of bolts disposed through bolt holes in the coupling surface, fastening the flange adapter union to the transmitter and compressing the seal;

an isolator diaphragm having an isolator surface for coupling pressure from the process fluid to the transmitter;

sensor means disposed in the transmitter for receiving a pressure and for providing the output; and coupling means coupled from the isolator means to the sensor means for coupling pressure therebetween comprising a substantially incompressible fluid; and wherein the improvement comprises that the isolator diaphragm is disposed between the bolts in the inlet means and the isolator surface is disposed to face the flange adapted union such that the transmitter has no flange.

8. An improved transmitter for providing an output indicative of a pressure of a process fluid supplied by a union, comprising:

an inlet for receiving the process fluid having a coupling surface facing the union and coupled thereto;

a seal disposed on the coupling surface for sealingly coupling the process fluid from the union to the inlet;

a pair of bolts disposed through bolt holes in the coupling surface, fastening the union to the transmitter and comprssing the seal;

an isolator diaphragm having an isolator surface for coupling pressure from the process fluid to the transmitter;

sensor means disposed in the transmitter for receiving a pressure and for providing the output; and coupling means coupled from the isolator means to the sensor means for coupling pressure therebetween comprising a substantially imcompressible fluid; and wherein the improvement comprises that the isolator diaphragm is dipsosed between the bolts in the inlet means and the isolator surface is disposed to face the union such that the transmitter has no flange and the transmitter comprises a housing having an isolator diaphragm at the inlet and an adpater ring having a portion sealing on the coupling surface and a second portion of smaller size than the first portion sealingly engaging the union.

9. An improved transmitter for providing an output indicative of a pressure of a process fluid supplied by a union, comprising:

an inlet for receiving the process fluid having a coupling surface facing the union and coupled thereto;

a seal disposed on the coupling surface for sealingly coupling the process fluid from the union to the inlet;

a pair of bolts disposed through bolt holes in the coupling surface, fastening the union to the transmitter and compressing the seal;

an isolator diaphragm having an isolator surface for coupling pressure from the process fluid to the transmitter;

sensor means disposed in the transmitter for receiving a pressure and for providing the output; and coupling means coupled from the isolator means to the sensor means for coupling pressure therebetween comprising a substantially incompressible fluid; and wherein the improvement comprises that the isolator diaphragm is disposed between the bolts in the inlet means and the isolator surface is disposed to face the union such that the transmitter has no flange and wherein the transmitter is a differential pressure transmitter having two inlets side by side and spaced apart to allow interfacing to standard orifice plate flange adapter unions.

10. The transmitter of claim 9 wherein the spacing of the bolt holes in the standard adapter unions is such that each union can be rotated about its center.

11. The transmitter of claim 10 wherein the bolt holes in the surface are in a substantially $2\frac{1}{8} \times 1\frac{3}{8}$ inch rectangular pattern.

12. The transmitter of claim 9 wherein the transmitter further comprises an adapter plate disposed between the inlets and the unions having passageways therethrough for coupling fluid from the unions to the inlets.

13. The transmitter of claim 12 wherein the bolts passing through the bolt holes in the flange adapter unions support the adapter plate.

14. The transmitter of claim 9 wherein the sensor means is a differential pressure sensor having a sensing diaphragm that is supported substantially across the entire sensor diaphragm surface at an overpressure condition.

15. The transmitter of claim 4 wherein the fluid contained in the transmitter has volume of less than 0.05 cubic inch.

16. A flangeless transmitter for providing an output indicative of a pressure of a process fluid, comprising:

a flange adapter union having a pair of mounting bolt holes and a central connector opening for receiving the fluid;

inlet means on the transmitter coupled to the flange adapter union for receiving the process fluid and having a coupling surface facing the flange adapter union;

seal means engaging the coupling surface and surrounding the connector opening for sealingly coupling the process fluid from the flange adapter union to the inlet means;

a separate fastener disposed through each of the bolt holes of the flange adapter union and surface, for fastening the flange adapter union to the transmitter and compressing the seal means;

isolator means having an isolator surface for coupling the process fluid pressure to the transmitter;

sensor means disposed in the transmitter for receiving a pressure from the isolator means and for providing an output; and a fluid contained in the transmitter coupling pressure from the isolator surface to the sensor means;

wherein the improvement comprises that the central connector opening of the flange adapter union opens to the isolator surface such that the flange adapter union couples fluid to the isolator surface without a massive flange therebetween.

17. The transmitter of claim 16 wherein the flange adapter union is an industry standard flange adapter union.

* * * * *

UNITED STATES PATENT AND TRADEMARK OFFICE
CERTIFICATE OF CORRECTION

PATENT NO. : 4,745,810

DATED : May 24, 1988

INVENTOR(S) : Dean S. Pierce et al.

It is certified that error appears in the above-identified patent and that said Letters Patent is hereby corrected as shown below:

Column 2, line 2, delete "cOmpliant" and insert --compliant--.

Column 9, line 3, after "case.", please delete "6. The quantity of corrosion-" and insert as a new, indented paragraph beginning on line 7:

--6. The quantity of corrosion- --.

Column 10, line 34, delete "imcompressible" and insert --incompressible--.

Column 11, line 13, delete "adapted" and insert --adapter--; line 25, delete "comprssing" and insert --compressing--; line 33, delete "imcompressible" and insert --incompressible--; line 36, delete "dipsosed" and insert --disposed--; line 40, delete "adpater" and insert --adapter--.

Column 12, line 29, delete "claim 4" and insert --claim 9--.

Signed and Sealed this

Sixth Day of December, 1988

Attest:

DONALD J. QUIGG

Attesting Officer

Commissioner of Patents and Trademarks